United States Patent
Kates et al.

(10) Patent No.: US 7,340,629 B2
(45) Date of Patent: Mar. 4, 2008

(54) METHOD AND SYSTEM FOR APPLICATION-BASED NORMALIZATION OF PROCESSOR CLOCKS IN A MULTIPROCESSOR ENVIRONMENT

(75) Inventors: Clive Richard Kates, Redlynch (GB); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/607,459

(22) Filed: Jun. 26, 2003

(65) Prior Publication Data

US 2004/0268172 A1  Dec. 30, 2004

(51) Int. Cl.
*G06F 1/12* (2006.01)
(52) U.S. Cl. ............. 713/400; 713/400; 713/500; 713/501; 713/502; 327/141; 327/144; 717/149; 714/731; 714/744; 714/814
(58) Field of Classification Search ........... 713/375, 713/400, 503, 600; 702/85, 106, 18; 455/208, 455/502; 377/78; 709/248; 968/920; 331/55
See application file for complete search history.

(56) References Cited

U.S. PATENT DOCUMENTS 5,875,320 A  2/1999  Gu .................. 395/553
5,964,846 A  10/1999  Berry et al. .......... 709/400
6,332,117 B1  12/2001  Berry et al. .......... 702/187

OTHER PUBLICATIONS

Doing et al., "Trace Synchronization in a Multiprocessor Environment", *IBM Technical Discl sure Bulletin*, pp. 161-162, Jun. 1992.

*Primary Examiner*—Nitin C. Patel
(74) *Attorney, Agent, or Firm*—Hamilton & Terrile, LLP; Stephen A. Terrile

(57) ABSTRACT

A method is presented for enabling application-level software to normalize processor clock values within a multiprocessor data processing system. A first processor number associated with a first processor is obtained such that the first processor executes one or more instructions for obtaining the first processor number. Subsequent to obtaining the first processor number, a processor clock value is obtained such that the processor clock value is associated with a processor that executes one or more instructions for obtaining the processor clock value. Subsequent to obtaining the processor clock value, a second processor number associated with a second processor is obtained such that the second processor executes one or more instructions for obtaining the second processor number. If the first processor number and the second processor number are equal, then the first processor number is used to retrieve a compensation value for a normalization operation on the processor clock value.

19 Claims, 6 Drawing Sheets

| PROCESSOR CLOCK COMPENSATION TABLE | PROCESSOR CLOCK PC1 | PROCESSOR CLOCK PC2 | PROCESSOR CLOCK PC3 | PROCESSOR CLOCK PC4 |
|---|---|---|---|---|
| PRIMARY PROCESSOR CLOCK PC0 | 0 | -113 | 73 | 11 |

*FIG. 3*
(PRIOR ART)

```
401 ----    ProcNumA = -1;
402 ----    ProcNumB = 0;
403 ----    until (ProcNumA == ProcNumB) {
404 ----        ProcNum_A = Get_Current_Processor();
405 ----        time = Get_Time();
406 ----        ProcNum_B = Get_Current_Processor();
            }
407 ----    time += timeDelta[ProcNumA];
```

*FIG. 4*

```
501 ----    timeDelta[0] = 0;
502 ----    for ProcNum = 1 to PROC_NUM_MAX {
503 ----        Bind_To_Proc(0);
504 ----        time0 = Get_Time();
505 ----        Bind_To_Proc(ProcNum);
506 ----        timeX = Get_Time();
507 ----        timeDelta[ProcNum] = timeX - time0;
            }
```

*FIG. 5A*

```
511 -----    timeDelta[0] = 0;
512 -----    for ProcNum = 1 to PROC_NUM_MAX {
513 -----        Bind_To_Proc(0);
514 -----        timeA0 = Get_Time();
515 -----        Bind_To_Proc(ProcNum);
516 -----        timeAX = Get_Time();
517 -----        Bind_To_Proc(ProcNum);
518 -----        timeBX = Get_Time();
519 -----        Bind_To_Proc(0);
520 -----        timeB0 = Get_Time();
521 -----        avgTime0 = (timeA0 + timeB0)/2;
522 -----        avgTimeX = (timeAX + timeBX)/2;
523 -----        timeDelta[ProcNum] = avgTimeX - avgTime0;
             }
```

*FIG. 5B*

```
531 -----    for ProcNum = 0 to PROC_NUM_MAX {
532 -----        Bind_To_Proc(ProcNum);
533 -----        timeA[ProcNum] = Get_Time();
             }
534 -----    for ProcNum = PROC_NUM_MAX to 0 by -1 {
535 -----        Bind_To_Proc(ProcNum);
536 -----        timeB[ProcNum] = Get_Time();
             }
537 -----    avgTime0 = (timeA[0] + timeB[0])/2;
538 -----    timeDelta[0] = 0;
539 -----    for ProcNum = 1 to PROC_NUM_MAX {
540 -----        avgTime[ProcNum] = (timeA[ProcNum] + timeB[ProcNum])/2;
541 -----        timeDelta[ProcNum] = avgTime[ProcNum] - avgTime0;
             }
```

*FIG. 5C*

METHOD AND SYSTEM FOR APPLICATION-BASED NORMALIZATION OF PROCESSOR CLOCKS IN A MULTIPROCESSOR ENVIRONMENT

BACKGROUND OF THE INVENTION

1. Field of the Invention

The present invention relates to an improved data processing system and, in particular, to a method and apparatus within a multiprocessor data processing system. Still more particularly, the present invention provides a method and apparatus for normalizing processor clock values within a multiprocessor data processing system.

2. Description of Related Art

There are many circumstances where processor clocks within a multiprocessor data processing system should be synchronized in order to accomplish certain tasks. One example is the gathering and recordation of performance information about processes and resources within the data processing system. Timestamps may be associated with performance information as it is written to a trace buffer or to a trace file, and the timestamps assist in an analysis of the performance information. A timestamp data structure or record may comprise multiple items of information, but each timestamp may be assumed to contain a clock value that is based on one or more processor clocks within the data processing system.

In a multiprocessor information handling system, each processor may have its own independent clock, whereby each clock is driven by a different oscillator. Although the clocks are designed to run at a specific rate, each may run at a slightly different speed. In addition, external factors, such as room temperature, may affect the accuracy of the oscillators, thereby causing the clocks to drift in relation to each other. In other words, the clocks may run at different and uneven speeds.

Over a period of time, such clock drifts can become large enough to cause problems for applications that depend on consistent clock readings for all processors in the system. For example, a performance analysis application may attempt to correlate trace information from multiple processors through the use of timestamps. If the clock values in the timestamps are based on processor clocks that are significantly askew, then any correlation based on the timestamps will be inaccurate, thereby causing unpredictable analytical results.

Some prior art solutions have attempted to solve the clock drift problem at the hardware level. For example, temperature data may be fed back to an oscillator so that the oscillator can adjust its frequency to reduce or remove variations due to temperature. However, there is typically no means provided at the hardware level of an information handling system to perform for clock synchronization.

Other prior art approaches have focused on clock synchronization in distributed systems, such as a computational environment in which a set of data processing systems coordinate their operations through a network. Communication operations among computers connected by networks typically take much longer than communication operations among tightly coupled processors in a multiprocessor system. Hence, the accuracy requirement for clock synchronization in a distributed system is significantly less than the accuracy requirement for a multiprocessor system. The prior art synchronization methods used in distributed systems would be inadequate for the degree of accuracy that is required for a multiprocessor system, especially if the multiprocessor system is a tightly coupled, symmetrical, shared-memory multiprocessor system.

In contrast to prior art solutions for clock synchronization using hardware support, many software-based prior art solutions have been provided for synchronizing clocks within a multiprocessor data processing system. Given that a software-based method for synchronizing clocks inherently lacks a hardware mechanism for adjusting the operation of a processor clock or for adjusting the operating conditions of a processor clock, software-based methods are typically implemented within an operating system. However, these software-based methods may vary significantly in their principles of operation.

For example, one prior art synchronization method involves the generation of a general system clock through software support within an operating system; the general system clock is then available through a special function in the operating system to all processes that are executing in the multiprocessor data processing system. Although a general system clock may be adequate for limited purposes in the information handling system, it is not adequate for performance measurement purposes. Further, a general system clock may require a considerable amount of system resources, thereby adversely affecting the performance of the system that is being analyzed if performance measurement code continually refers to the general system clock during its operation.

Many other prior art solutions for synchronizing clocks with the support of an operating system involve the implementation of a normalization process within the operating system, whereby the operating system normalizes the clock values for each processor clock. These normalized clock values possess an accuracy that is adequate for many purposes, including performance analysis. However, some operating systems do not provide this functionality.

Consequently, although there may be a variety of hardware-based and software-based mechanisms for synchronizing multiple processor clocks within a multiprocessor data processing system, some multiprocessor data processing systems do not provide a synchronization mechanism or do not provide a mechanism that is adequate for the purposes of many applications. Therefore, it would be desirable to have a method within a multiprocessor data processing system for synchronizing processor clocks by an application that has a specific need for synchronized processor clocks. More generally, it would be advantageous to have a mechanism for implementing an application-level process for synchronizing multiple processor clocks in a multiprocessor data processing system.

SUMMARY OF THE INVENTION

A method, system, apparatus, and computer program product are presented for enabling application-level software to normalize processor clock values within a multiprocessor data processing system. A first processor number associated with a first processor is obtained such that the first processor executes one or more instructions for obtaining the first processor number. Subsequent to obtaining the first processor number, a processor clock value is obtained such that the processor clock value is associated with a processor that executes one or more instructions for obtaining the processor clock value. Subsequent to obtaining the processor clock value, a second processor number associated with a second processor is obtained such that the second processor executes one or more instructions for obtaining the second processor number. If the first processor number and the second processor number are equal, then the first processor number is used to retrieve a compensation value for a normalization operation on the processor clock value.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 3 depicts a table that represents a typical one-dimensional array of compensation values that are associated with a set of processor clocks in a multiprocessor system;

FIG. 4 depicts a pseudo-code routine comprising a set of pseudo-code statements in which the pseudo-code routine represents a process having a series of steps that may be implemented in application-level code for performing a processor clock normalization operation in a multiprocessor system;

FIGS. 5A-5C depict pseudo-code routines comprising a set of pseudo-code statements represent processes having a series of steps that may be implemented in application-level code for determining a set of compensation values to be used within a processor clock normalization operation in a multiprocessor system;

DETAILED DESCRIPTION OF THE INVENTION

In general, the components that may comprise or relate to the present invention may include a wide variety of data processing technology. Therefore, as background, a typical organization of hardware and software components within a distributed data processing system is described prior to describing the present invention in more detail.

Figure 1:
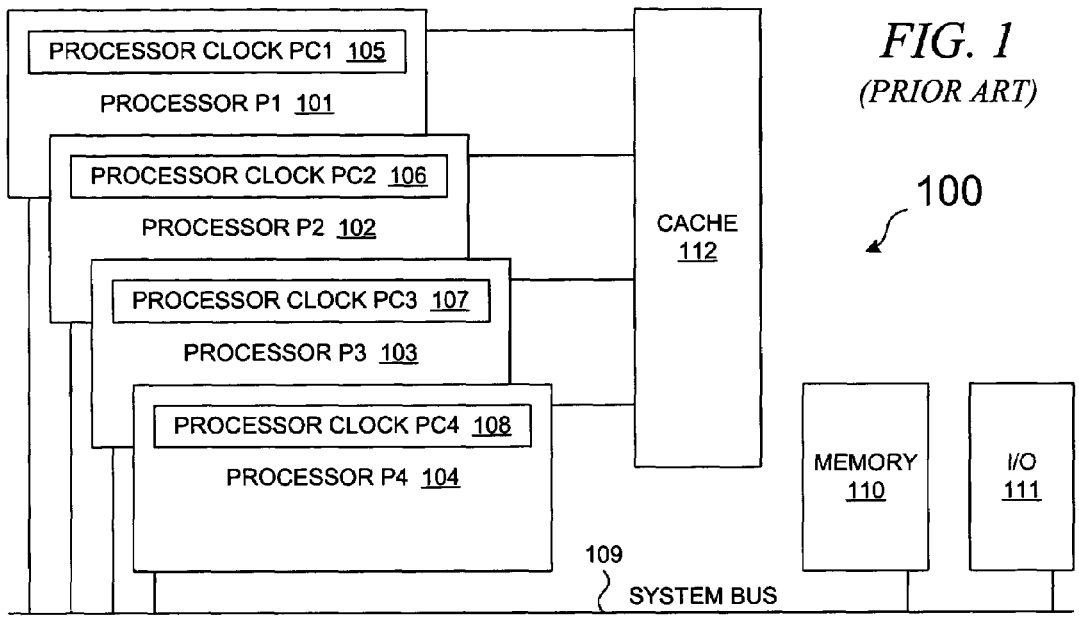
FIG. 1 depicts a block diagram that shows a set of hardware components in a typical multiprocessor data processing system in which the present invention may be implemented.

With reference now to FIG. 1, a block diagram depicts a set of hardware components in a typical multiprocessor data processing system in which the present invention may be implemented. Multiprocessor data processing system 100 includes multiple processors 101-104, each of which comprises an internal processor clock, shown as processor clocks 105-108. Each processor is connected by system bus 109 to main memory 110 and input/output (I/O) system 111; memory 110 stores operating system modules and application modules for execution. Each processor may also be connected to cache 112 as necessary. FIG. 1 is intended as an example of a multiprocessor system and not as an architectural limitation for the present invention; the arrangement of the memory system, the I/O system, cache, multiple processors, and other components that may be present in a multiprocessor system but that are not shown in the figure are not essential to the present invention and may be implemented in a variety of configurations.

The software components in a computer system can be viewed as having a logical organization that comprises layers of functions. The kernel of the operating system provides a core set of functions that acts as an interface to the hardware; thus, the kernel is viewed as residing as a layer of software just above the hardware. I/O functions can be viewed as being resident in a next higher level, while memory management and memory-related functions can be viewed as being resident in the next highest level. User applications and other programs access the functions in the other layers to perform general data processing; thus, application-level code is viewed as residing in the logically highest layer of software. Assuming that the operating system is extensible, software drivers and kernel extensions may be added to the operating system to support various additional functions required by user applications. From the perspective of an application, all of the other layers of software might be viewed as the operating system and termed "kernel-level code". In general, application-level software executes at lower priority and with a lower level of execution privileges than kernel-level code, which is sometimes described as executing in supervisory mode.

As a processor operates, its processor clock generates clock signals or clock interrupts. A clock value is an accumulation of the clock signals or interrupts; each clock period is substantially identical, and the clock period is measured with a standard time unit, such as a fraction of a second. By incrementing the clock value on each clock signal or interrupt, the clock value represents the passage of time. The clock value can be correlated with some external clock value, sometimes termed "wall-clock time", such as Greenwich Mean Time (GMT).

As mentioned above, a set of processor clocks within a multiprocessor system, such as processor clocks 105-108 that are shown in FIG. 1, may not be synchronized at the hardware level. Hence, the processor clocks operate at slightly different and uneven speeds even though they were designed and intended to operate at the same steady speed. Although all of the processors may be started substantially at the same time, their clocks will tend to drift with respect to one another. At some point in time, their respective clock values may be significantly different.

Although the present invention may be implemented on a variety of multiprocessor systems, the present invention assumes that the processor clocks are not synchronized by the hardware of a multiprocessor system on which the present invention is implemented. It should be noted, however, that the present invention may be implemented on a multiprocessor system in which the processor clocks are synchronized at the hardware level without deleterious affects to the results provided by the present invention.

Skewed clock values within a multiprocessor system may be a problem when an attempt is made to implement certain functionality within a particular multiprocessor system. However, the question of whether or not skewed clock values are a problem also depends on the capabilities of a particular multiprocessor system.

For example, one may attempt to implement performance measurement code on a particular multiprocessor system, and the performance measurement code may write timestamps into a performance information buffer along with performance information from all of the processors. An attempt is then made to correlate the timestamps during a subsequent analysis of the performance information. Even though the clock values for the timestamps may be skewed, the timestamps may nevertheless be accurately correlated; the question of whether or not the timestamps can be accurately correlated may also depend on whether or not the multiprocessor system provides a consistent scheme for accessing the processor clocks from which the timestamps are generated, i.e., whether or not the multiprocessor system provides a consistent logical view of the processor clocks by the performance measurement code that is generating the timestamps.

In other words, an accurate correlation of the timestamps does not necessarily require synchronized processor clocks. For example, if the operating system of a particular multiprocessor system operated in such a manner as to ensure that a particular application thread with performance measurement code always executed on a particular processor after its initial dispatch, then the timestamps from a particular thread would always be based on a particular processor clock, thereby providing a consistent logical view of the plurality of processor clocks by the performance measurement code. With knowledge of this fact, then the timestamps could be correlated in some manner, possibly by compensating for the clock skew in a post-processing fashion. However, it is generally the case that operating systems do not ensure that a thread is always executed on a particular processor after its initial dispatch, as illustrated hereinbelow.

Although the present invention may be implemented on a variety of operating systems, the present invention assumes that a thread is not always executed on a particular processor after its initial dispatch by an operating system on which the present invention is implemented. It should be noted, however, that the present invention may be implemented on an operating system in which the operating system ensures that a thread is always executed on a particular processor after its initial dispatch without deleterious affects to the results provided by the present invention.

Figure 2A:
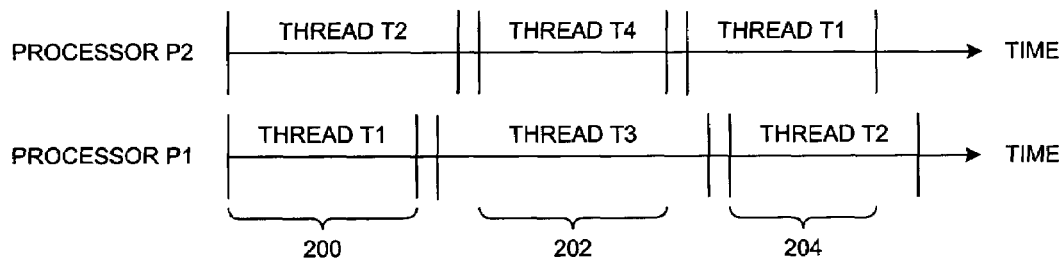
FIGS. 2A and 2B depict a pair of timing diagrams that represent typical mappings between application threads and processors that are executing those threads within a multiprocessor system.
Figure 2B:
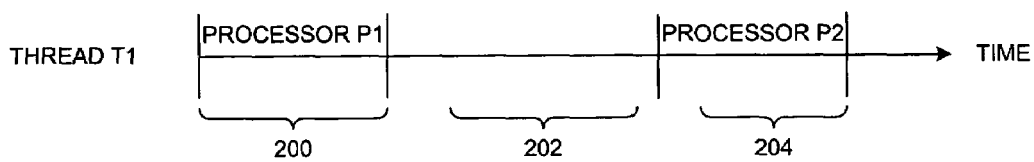

With reference now to FIGS. 2A and 2B, a pair of timing diagrams represent typical mappings between application threads and processors that are executing those threads within a multiprocessor system, such as the multiprocessor system that is shown in FIG. 1. FIG. 2A represents a mapping of multiple threads onto multiple processors over multiple time periods, whereas FIG. 2B represents a mapping of one particular thread onto multiple processors over multiple time periods. Referring to FIG. 2A, during time period 200, threads T1 and T2 are shown as executing simultaneously on two processors P1 and P2. The execution of each thread is then suspended by the operating system; the threads may be suspended for a variety of reasons: while they wait for the completion of an I/O operation; because the time slice that has been allocated to the thread has concluded; or for some other reason. The operating system then allocates the processors to two other threads T3 and T4; during time period 202, threads T3 and T4 are shown as executing simultaneously on processors P1 and P2. Subsequently, during time period 204, threads T1 and T2 again execute simultaneously. However, during time period 204, neither of threads T1 and T2 is executing on the same processor on which it was executing during time period 200.

In the example that is shown in FIG. 2A, the operating system has assigned threads in accordance with an algorithm that does not ensure that a particular thread will be executed on the processor on which the thread was previously executed. Referring to FIG. 2B, a timing diagram shows the same example from the perspective of a particular thread, i.e., thread T1. During time period 200, thread T1 executes on processor P1, while during time period 204, thread T1 executes on processor P2; during time period 202, thread T1 does not execute.

As described above, the processor clocks in most multiprocessor systems tend to drift with respect to each other because they are not synchronized at the hardware level. Moreover, most operating systems do not always execute a particular thread on a particular processor in a multiprocessor system after the thread's initial dispatch, thereby causing an application thread over time to view skewed clock values from skewed processor clocks. Hence, some operating systems include functionality that dynamically normalizes the processor clocks in a multiprocessor system as described hereinbelow.

With reference now to FIG. 3, a table depicts a typical one-dimensional array of compensation values that are associated with a set of processor clocks in a multiprocessor system. In a typical fashion, each processor in a multiprocessor system has an independent processor clock, and one processor clock is selected as a primary processor clock. At some point in time, the difference between the primary clock and the other processor clocks is determined; these determinations may or may not be completed at substantially different points in time for each processor clock. The difference between a particular processor clock and the primary processor clock becomes the adjustment value or the compensation value for a particular processor clock; the compensation value may be a negative value, and the compensation value is stored in an appropriate number form that is measured with a standard unit of time, such as a fraction of a second. When necessary, the compensation value for a particular processor clock is added to its clock value in order to normalize its clock value with the clock value of the primary processor clock.

As shown in FIG. 3, a set of compensation values are stored in association with each processor clock in a one-dimensional array. A particular compensation value is used for normalizing a clock value that is reported for a particular processor clock with the clock value of a primary processor clock; the compensation value may be retrieved from the one-dimensional array using the processor number that has been associated with the particular processor by the operating system.

Although a normalization process may not produce clock values that are as accurate as clock values from processor clocks that are synchronized at the hardware level, the normalization process possesses an accuracy that is adequate for many purposes, including performance measurement. Many operating systems, though, do not provide the functionality of processor clock normalization. Moreover, prior art solutions for processor clock normalization operations have been implemented in kernel-level code that can employ various resources that are only available to kernel-level code. An attempt to implement a processor clock normalization operation in accordance with these prior art solutions within application-level code would be problematic.

Given the description of background material hereinabove for a typical multiprocessor system and typical processor clock normalization operations that are accomplished at the kernel level, the present invention is now described in detail hereinbelow. The present invention is directed to a method for a processor clock normalization operation in a multiprocessor system that is accomplished at the application level, as described with respect to the remaining figures.

With reference now to FIG. 4, a pseudo-code routine comprising a set of pseudo-code statements depicts a process having a series of steps that may be implemented in application-level code for performing a processor clock normalization operation in a multiprocessor system in accordance with a preferred embodiment for the present invention. Statements 401 and 402 initialize a pair of variables in which the values of the variables will subsequently represent processor identifiers or numbers that have been assigned to respective processors in a multiprocessor system by the operating system of the multiprocessor system; in this example, the variables are identified as "ProcNumA" and "ProcNumB". Statement 403 is a control statement that resolves to a logical value that controls a processing loop; in this example, the processing loop continues to be executed until statement 403 determines that the processor identifiers or numbers in the two processor ID variables are equal to each other.

Statement 404 obtains the processor identifier for the current processor and assigns the obtained processor identifier to the first processor identifier variable; the current processor is the processor on which the current thread is executing, and the current thread contains the code for the series of steps that is shown in FIG. 4. Statement 405 obtains the current clock value for the current thread, i.e., the clock value (or time value) as determined by the processor clock for the current processor, and stores the current clock value in a variable. Statement 406 then obtains the processor identifier for the current processor and assigns the obtained processor identifier to the second processor identifier variable.

Statements 404-406 may call an appropriate function to obtain the required information, or the required information may be obtained through a set of statements without calling a function or some other type of subroutine; the manner in which the required functionality is implemented may vary in various embodiments of the present invention. For example, the required functionality may be implemented completely or partially within application-level code or within kernel-level code.

The processing loop then returns to statement 403, which determines whether the values in the first processor identifier variable and the second processor identifier variable are equal. If not, then the statements within the control loop are executed again. If the values are equal, then the control loop is exited.

In this manner, the control loop is executed until the values in the first processor identifier variable and the second processor identifier variable are equal. In other words, the control loop is executed until statements 404 and 406 are executed on the same processor; in that case, the current processor is identifiable by either the first processor identifier variable or the second processor identifier variable.

Statement 407 concludes the processor clock normalization operation by obtaining the compensation value for the current processor and adding the compensation value to the clock value for the current processor. It is assumed that a set of compensation values for the set of processors in a multiprocessor system are available in a table or an array, as shown in FIG. 3, in which the array is accessible to application-level code. The manner in which the set of compensation values are generated may vary with various embodiments of the present invention; an example of an application-level processor for generating the set of compensation values is described in more detail further below. Although the example in FIG. 4 shows statement 407 as employing the first processor identifier variable, statement 407 could employ either the first processor identifier variable or the second processor identifier variable since the current processor is identifiable by either the first processor identifier variable or the second processor identifier variable.

The present invention provides a solution for implementing a processor clock normalization operation within application-level code after recognizing that it can be difficult for application-level code to match an identifier for the current processor with the clock value for the current processor. The present invention recognizes that the step of determining the current processor by the application-level code and the step of determining the current clock value by the application-level code may occur on different processors within a multiprocessor system because of the manner in which the execution of an application thread can move from one processor to another processor at critical times during the processor clock normalization operation.

Referring to the examples shown in FIG. 2B and FIG. 4, a first processor could execute instructions for statement 405 that is shown in FIG. 4 during time period 200 that is shown in FIG. 2B, whereas a second processor could execute instructions for statement 406 during time period 204 because the operating system has moved the execution of the application thread containing instructions for statements 405 and 406 during time period 202. The results of a mismatch between a processor number for a first processor and a clock value for a second processor would be indeterminate yet almost always erroneous. In response to a recognition that prior art solutions for processor clock normalization operations at the kernel level did not have this difficulty, the present invention provides a solution, e.g., as shown in FIG. 4.

The present invention is effective because it ensures in almost all cases that the clock value and the processor identifier that are used during the processor clock normalization operation are associated with the same processor; instructions for obtaining the clock value for the current processor are bracketed by instructions for obtaining an identifier for the current processor. Given that an application thread is generally provided a minimum period of execution (or time slice) on a processor when dispatched, the present invention ensures to a high degree of probability that the execution of an application has not moved from one processor to another processor during a particularly important period of time, i.e., between the point in time in which a clock value is obtained for the current processor (the processor that is executing the instructions to obtain the clock value) and the point in time in which a processor identifier is obtained for the current processor (the processor that is executing the instructions to obtain the processor identifier), e.g., between statements 404 and 406 as shown in FIG. 4; if it is determined that this is not true as indicated by obtaining different processor numbers before and after obtaining the clock value, then the operation is performed repeatedly until it is true. After it is determined that the obtained clock value and the obtained processor number are both associated with the same processor, then the normalization operation is completed by obtaining the compensation value that is associated with the identified processor and adding its compensation value to its clock value, e.g., at statement 407 in FIG. 4.

As mentioned above, the manner in which an implementation of the present invention may obtain the processor number for the current processor and the clock value for the current processor may vary; the manner in which the clock value for the current processor is obtained is not further discussed herein. Prior to presenting multiple embodiments for obtaining the processor number for the current processor, various embodiments are presented for generating a set of compensation values for a set of processor clocks in a multiprocessor system for use in a processor clock normalization operation.

With reference now to FIGS. 5A-5C, pseudo-code routines comprising a set of pseudo-code statements depict processes having a series of steps that may be implemented in application-level code for determining a set of compensation values to be used within a processor clock normalization operation in a multiprocessor system in accordance with embodiments of the present invention. In each of the examples in FIGS. 5A-5C, it is assumed that the primary processor is assigned a processor number of zero, and the compensation value for the primary processor is equal to zero because the primary processor does not require a normalization operation with respect to itself.

Referring now to FIG. 5A, statement 501 initializes the compensation value for the primary processor to zero. Statement 502 controls an iterative loop through all of the remaining processor numbers, i.e., all of the processors except the primary processor because all of the other processors are normalized with respect to the primary processor. With the completion of one loop, one compensation value is computed; when the entire loop control is concluded, then the process of computing the set of compensation values is complete.

Statement 503 calls an operating system function that causes the application thread to be bound by the operating system to the requested processor as identified by the processor number that is passed to the operating system function in the function parameter. After calling this function, the application thread is suspended, i.e., enters a sleep state. At some subsequent point in time, the operating system moves the execution of the application thread to the requested processor, if necessary; it is possible that the application thread may already be executing on the requested thread. When the application thread continues executing after returning from the function call, i.e., after being bound to the requested processor, the application thread may assume that it will continue to execute on the requested processor for some minimal amount of time before the operating system would switch the execution of the application thread to a different processor.

In statement 503, the requested processor is processor number zero, i.e., the primary processor, so the application thread is bound to the primary processor. Hence, statement 504 obtains the current clock value for the primary processor and stores it. In statement 505, the requested processor is identified by the value of the iterative loop variable; statement 505 causes the application thread to be bound to the requested processor, while statement 506 obtains the current clock value for the requested processor and stores it.

At statement 507, a compensation value is computed for the requested processor and stored in an appropriate array for subsequent use during a processor clock normalization process as described above with respect to FIG. 4. In the example that is shown in FIG. 5A, the compensation value is computed as the difference in the clock values between the primary processor and the requested processor.

Referring now to FIG. 5B, statement 511 initializes the compensation value for the primary processor to zero, and statement 512 controls an iterative loop through all of the remaining processor numbers. At statement 513, the application thread is bound to the primary processor, and statement 514 obtains the current clock value for the primary processor and stores it in a first clock value variable for the primary processor.

In statements 515-518, the requested processor is identified by the iterative loop variable. Statement 515 causes the application thread to be bound to the requested processor, while statement 516 obtains the current clock value for the requested processor and stores it in a first clock variable for the requested processor; these steps are substantially repeated at statements 517 and 518. Statement 517 causes the application thread to be bound to the requested processor, while statement 518 obtains the current clock value for the requested processor and stores it in a second clock value variable for the requested processor.

Statements 519 and 520 substantially repeat statements 513 and 514; at statement 519, the application thread is bound to the primary processor, and statement 520 obtains the current clock value for the primary processor and stores it in a second clock value variable for the primary processor.

Statement 521 computes an average clock value for the primary processor using the first and second clock value variables for the primary processor. Statement 522 computes an average clock value for the requested processor using the first and second clock value variables for the requested processor. At statement 523, a compensation value is computed for the requested processor and stored in an appropriate array for subsequent use during a processor clock normalization process as described above with respect to FIG. 4. In the example that is shown in FIG. 5B, the compensation value is computed as the difference in the average clock values between the primary processor and the requested processor; however, more complex computations may be performed to obtain the compensation value after the clock values have been retrieved.

Hence, the process that is shown in FIG. 5B differs from the process that is shown in FIG. 5A. In FIG. 5B, an attempt is made to filter out any latency time that is introduced to a computed compensation value for a particular processor clock when the application thread calls the operating system function to bind to the particular processor, whereas in FIG. 5A, the computed compensation time would include this additional latency. In FIG. 5B, the process essentially computes a compensation value for a particular processor clock $PC_x$ by reading the clock values in pairs in the following sequence: $PC_0$, $PC_x$, $PC_x$, $PC_0$; after computing the compensation value for processor clock $PC_x$, the process then continues to the next processor clock $PC_{x+1}$. In contrast, FIG. 5C is similar to FIG. 5B except that FIG. 5C attempts to filter out the introduction of any latency time for binding to a processor by computing all of the compensation values for all of the processor clocks in a single pass rather than by computing one compensation value across multiple passes. In FIG. 5C, the process essentially computes the compensation values for all processor clocks $PC_i$ by reading the clock values in pairs in the following sequence: $PC_0$, $PC_1$, $PC_2$, ... $PC_{max-1}$, $PC_{max}$, $PC_{max}$, $PC_{max-1}$, ... $PC_1$, $PC_0$; after gathering all pairs of clock values, the process then computes all of the compensation values.

Referring now to FIG. 5C, statement 531 controls an iterative loop through all processor numbers from the lowest processor number to the highest processor number. At statement 532, the application thread is bound to a requested processor as identified by the value of the iterative loop variable, and statement 533 obtains the current clock value for the requested processor and stores it in a first clock value array.

Statements 534-536 execute an iterative loop that is similar to statements 531-533 except that the iterative loop that is controlled by statement 534 decrements the iterative loop variable whereas the iterative loop that is controlled by statement 531 increments the iterative loop variable. At statement 535, the application thread is bound to a requested processor as identified by the value of the iterative loop variable, and statement 536 obtains the current clock value for the requested processor and stores it in a second clock value array.

Statement 537 computes an average clock value for the primary processor using the first and second clock values for the primary processor that are stored in the first and second clock value arrays. Statement 538 forces the compensation value for the primary processor to be equal to zero.

Statement 539 controls an iterative loop through all of the remaining processors other than the primary processor. Statement 540 computes an average clock value for a processor as identified by the value of the iterative variable using the first and second clock value arrays. At statement 541, a compensation value is computed for a processor as identified by the value of the iterative variable and stored in an appropriate array for subsequent use during a processor clock normalization process as described above with respect to FIG. 4. In the example that is shown in FIG. 5C, the compensation value is computed as the difference in the average clock values between the primary processor and the processor as identified by the value of the iterative variable; however, more complex computations may be performed to obtain the compensation value after all of the pairs of clock values have been gathered.

Given the various embodiments that have been presented for generating a set of compensation values for a set of processor clocks in a multiprocessor system for use in a processor clock normalization operation, the description now turns to presenting multiple embodiments for obtaining the processor number for the currently executing processor by application-level code.

Figure 6A:
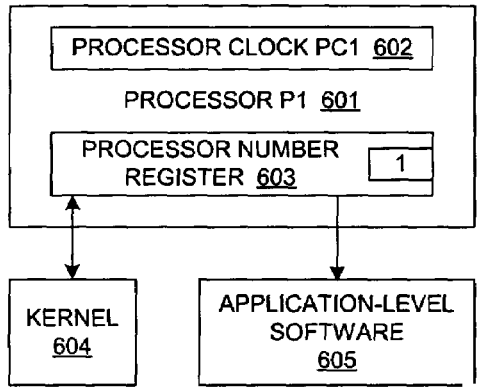
FIG. 6A depicts a block diagram that shows a processor with a special register for storing the processor number that has been assigned to a processor within a multiprocessor system and for allowing the processor number to be read by application-level code.

With reference now to FIG. 6A, a block diagram depicts a processor with a special register for storing the processor number that has been assigned to a processor within a multiprocessor system and for allowing the processor number to be read by application-level code. Processor 601 includes processor clock 602; processor 601 is one processor in a set of processors in a multiprocessor system in a manner similar to the processors that are shown in FIG. 1. In contrast, processor 601 also includes processor number register 603 for storing the processor number of processor 601 as assigned by operating system kernel 604 in the multiprocessor system. In some processor architectures, a processor number may be stored in a processor register, but that processor register may only be accessed by kernel-level or supervisory code. In this embodiment of the present invention, the processor number register can be read by application-level code 605 without supervisory privileges.

Figure 6C:
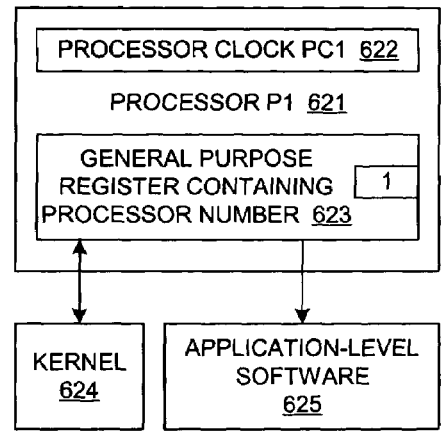
FIG. 6C depicts a block diagram that shows a processor with a general purpose register that has been reserved by the operating system for storing the processor number that has been assigned to a processor within a multiprocessor system.
Figure 6B:
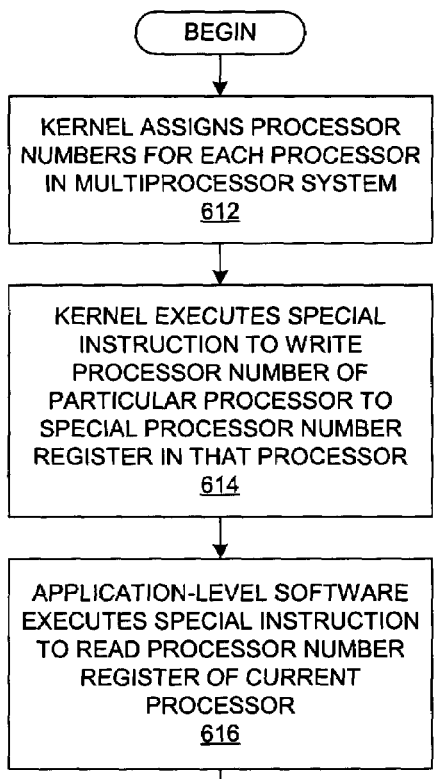
FIG. 6B depicts a flowchart that shows a process by which a processor can use a special register for storing the processor number that has been assigned to a processor within a multiprocessor system.

With reference now to FIG. 6B, a flowchart depicts a process by which a processor can use a special register for storing the processor number that has been assigned to a processor within a multiprocessor system. The process begins with the operating system kernel assigning a set of processor numbers for the set of operational processors in a multiprocessor system (step 612). The kernel then executes a special instruction that writes the assigned processor number for a particular processor to the special processor number register within the particular processor (step 614); this step would be completed in a similar manner for each processor in the multiprocessor system. At some subsequent point in time, an instruction within an application level thread is executed, wherein the instruction reads the processor number from the processor number register within the processor that has executed the instruction (step 616), thereby concluding the process.

In this manner, the application-level code can obtain the processor number register directly without requiring a request to the operating system for assistance; a special processor number register with a corresponding instruction for reading it provides an exemplary mechanism for implementing statement 404 or 406 within FIG. 4. After obtaining the processor number, the application thread can obtain the appropriate compensation value to be used in a processor clock normalization operation for the identified processor.

With reference now to FIG. 6C, a block diagram depicts a processor with a general purpose register that has been reserved by the operating system for storing the processor number that has been assigned to a processor within a multiprocessor system. Processor 621 includes processor clock 622; processor 621 is one processor in a set of processors in a multiprocessor system in a manner similar to the processors that are shown in FIG. 1. In contrast, processor 621 includes general purpose register 623 that has been reserved by the operating system for storing the processor number of processor 621 as assigned by operating system kernel 624 in the multiprocessor system. In this embodiment of the present invention, the processor number register can be read by application-level code 625 to obtain the processor number; it may be assumed that the application-level code is compiled in view of its anticipated execution by this type of operating system with these requirements.

Figure 6D:
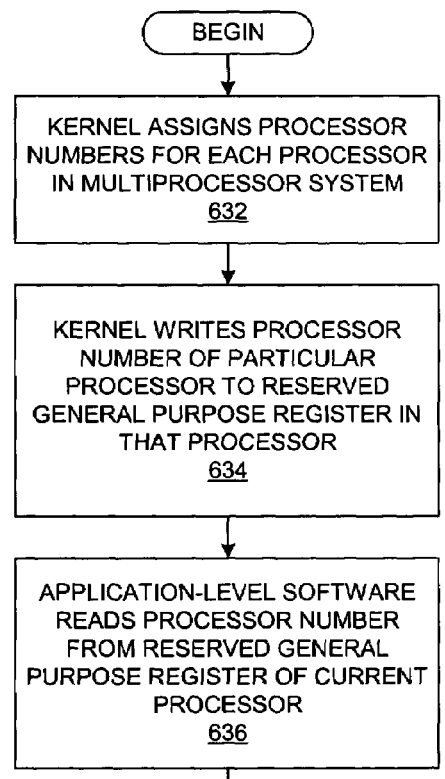
FIG. 6D depicts a flowchart that shows a process by which a processor uses a general purpose register that has been reserved by the operating system for storing the processor number that has been assigned to a processor within a multiprocessor system.

With reference now to FIG. 6D, a flowchart depicts a process by which a processor uses a general purpose register that has been reserved by the operating system for storing the processor number that has been assigned to a processor within a multiprocessor system. The process begins with the operating system kernel assigning a set of processor numbers for the set of operational processors in a multiprocessor system (step 632). The kernel then executes an instruction that writes the assigned processor number for a particular processor to the general purpose register that is within the particular processor and that has been reserved for storing the processor number (step 634); this step would be completed for each processor in the multiprocessor system. At some subsequent point in time, an instruction within an application level thread is executed, wherein the instruction reads the processor number from the general purpose register within the processor that has executed the instruction and that contains the processor number that was assigned by the operating system (step 636), thereby concluding the process.

In this manner, the application-level code can obtain the processor number register directly without requiring a request to the operating system for assistance; a general purpose register that has been reserved for the processor number provides another mechanism for implementing statement 404 or 406 within FIG. 4. After obtaining the processor number, the application thread can obtain the appropriate compensation value to be used in a processor clock normalization operation for the identified processor.

Figure 6E:
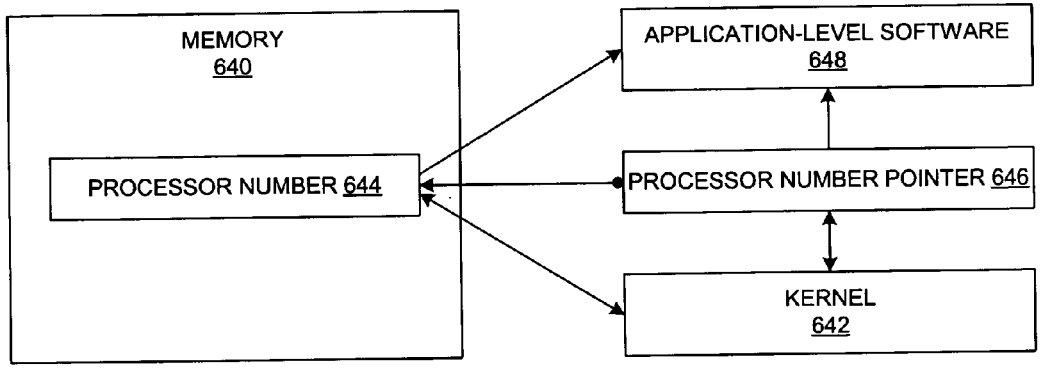
FIG. 6E depicts a block diagram that shows a mechanism for providing a processor number for a current processor to application-level code by the operating system through a particular memory location.

With reference now to FIG. 6E, a block diagram depicts a mechanism for providing a processor number for a current processor to application-level code by the operating system through a particular memory location. Memory 640 is accessible by multiple processors in a multiprocessor system in a manner similar to memory 110 that is shown in FIG. 1. Operating system kernel 642 reserves memory location 644 for storing the processor number of a particular processor within the multiprocessor system. Operating system kernel 642 provides processing number pointer 646 to application-level code 648; processing number pointer 646 points to the memory location that has been reserved for storing the processor number of the processor on which application-level code 648 is executing. Application-level code 648 uses processing number pointer 646 to retrieve the processor number of its current processor from memory location 644.

Figure 6F:
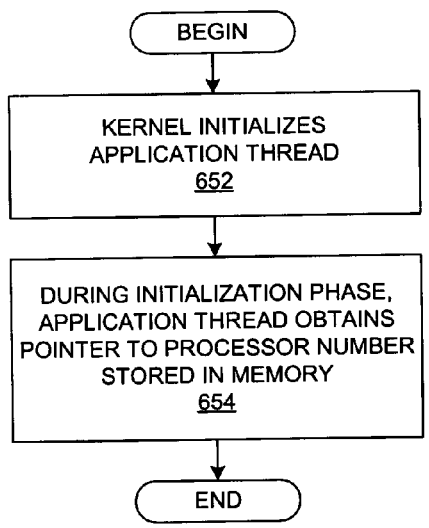
FIGS. 6F-6G depicts a pair of flowcharts that show a pair of processes for using a pointer to a processor number that is stored in memory in the manner that is shown in FIG. 6E.
Figure 6G:
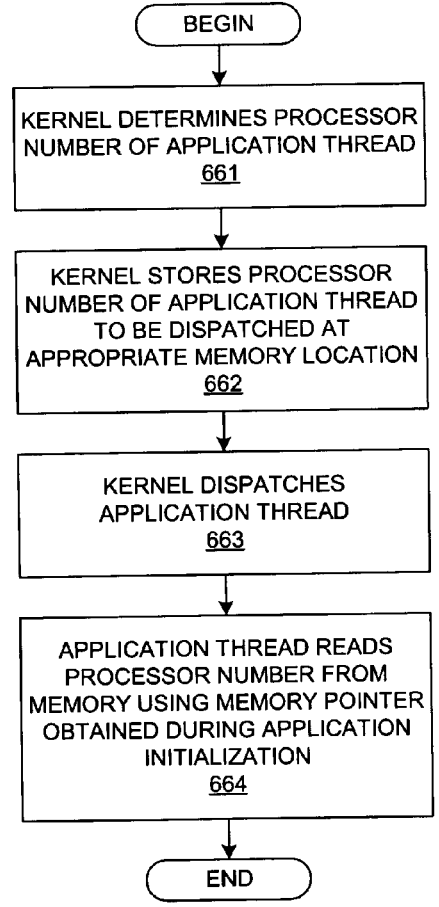

With reference to FIGS. 6F-6G, a pair of flowcharts depict a pair of processes for using a pointer to a processor number that is stored in memory in the manner that is shown in FIG. 6E. FIG. 6F depicts a process for setting up the mechanism for indicating the current processor number, while FIG. 6G depicts a process for obtaining the processor number.

Referring now to FIG. 6F, the process begins with the kernel initializing an application thread (step 652), which includes reserving a memory location for storing a processor number for the processor that will execute the application thread. During the initialization of the application thread, the application thread calls a special function within the kernel to obtain various information, including the pointer to the memory location that will contain the processor number on which the application thread is executing (step 654), thereby concluding the process.

Referring now to FIG. 6G, the process begins with the kernel determining the processor number of the processor on which the kernel is preparing to dispatch an application thread for execution (step 661). The kernel then writes the determined processor number to the appropriate memory location (step 662) using the memory pointer that was previously provided to the application thread during its initialization phase. The kernel then dispatches the application thread (step 663). After the application thread begins executing, the application thread reads the processor number from the appropriate memory location using the pointer that was previously provided by the kernel (step 664), thereby concluding the process. Thus, step 664 provides another mechanism for implementing statement 404 or 406 within FIG. 4. After obtaining the processor number, the application thread can obtain the appropriate compensation value to be used in a processor clock normalization operation for the identified processor.

Figure 6H:
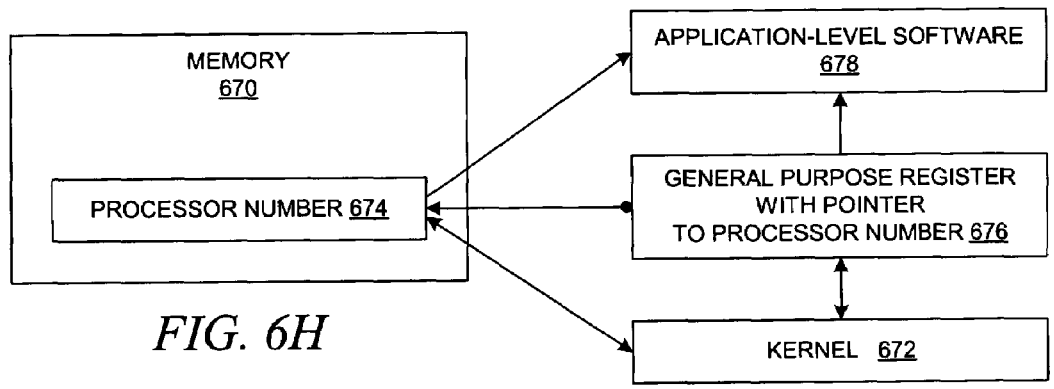
FIG. 6H depicts a block diagram that shows a mechanism for providing a processor number for a current processor to application-level code by the operating system through a particular memory location with indirection through a reserved processor register.

With reference now to FIG. 6H, a block diagram depicts a mechanism for providing a processor number for a current processor to application-level code by the operating system through a particular memory location with indirection through a reserved processor register. Memory 670 is accessible by multiple processors in a multiprocessor system in a manner similar to memory 110 that is shown in FIG. 1. Operating system kernel 672 reserves memory location 674 for storing the processor number of a particular processor within the multiprocessor system. Operating system kernel 672 provides a pointer to the processor number by storing the pointer within reserved processor register 676, which can be read by application-level code 678; reserved processor register 676 points to the memory location that has been reserved for storing the processor number of the processor on which application-level code 678 is executing. Application-level code 678 uses the pointer to the processor number within reserved processor register 676 to retrieve the processor number of its current processor from memory location 674.

Figure 6I:
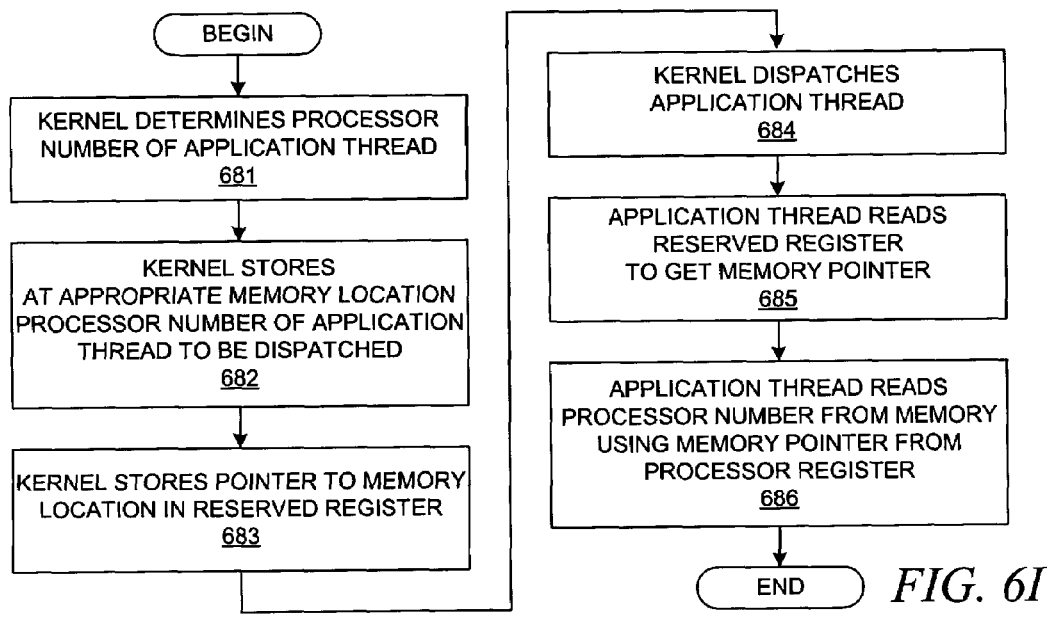
FIG. 6I depicts a flowchart that shows a process for using a pointer to a processor number that is stored in memory in the manner that is shown in FIG. 6H.

With reference to FIG. 6I, a flowchart depicts a process for using a pointer to a processor number that is stored in memory in the manner that is shown in FIG. 6H. The process begins with the kernel determining the processor number of the processor on which the kernel is preparing to dispatch an application thread for execution (step 681). The kernel then writes the determined processor number to an appropriate memory location (step 682). The kernel then stores a pointer to the memory location in a register that has been reserved for that purpose (step 683). The kernel then dispatches the application thread (step 684). After the application thread begins executing, the application thread reads the reserved register to get the pointer to the memory location at which the processor number is stored (step 685), after which the application thread reads the processor number from the appropriate memory location using the pointer that was retrieved from the reserved register (step 686), thereby concluding the process. Thus, step 685 together with step 686 provides another mechanism for implementing statement 404 or 406 within FIG. 4. After obtaining the processor number, the application thread can obtain the appropriate compensation value to be used in a processor clock normalization operation for the identified processor.

Figure 6J:
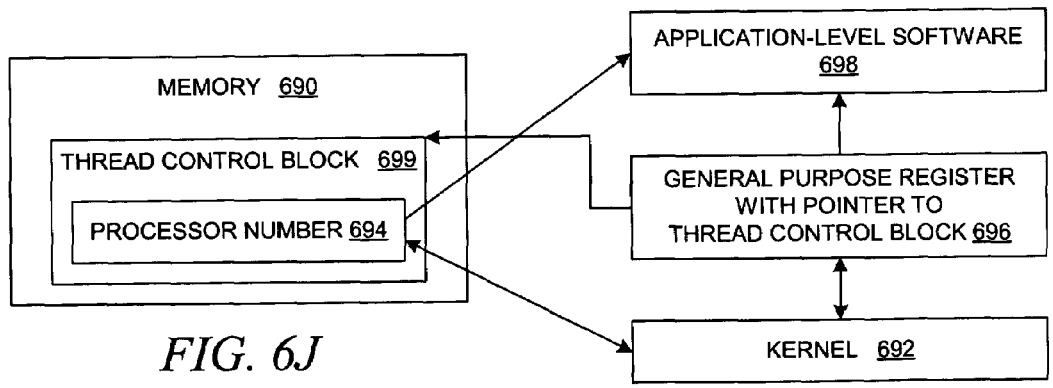
FIG. 6J depicts a block diagram that shows a mechanism for providing a processor number for a current processor to application-level code by the operating system through a particular memory location in a special thread control data structure with indirection through a reserved processor register.

With reference now to FIG. 6J, a block diagram depicts a mechanism for providing a processor number for a current processor to application-level code by the operating system through a particular memory location in a special thread control data structure with indirection through a reserved processor register. Memory 690 is accessible by multiple processors in a multiprocessor system in a manner similar to memory 110 that is shown in FIG. 1. Operating system kernel 692 reserves memory location 694 for storing the processor number of a particular processor within the multiprocessor system. Operating system kernel 692 provides a pointer to a thread-specific data structure that contains the processor number; operating system kernel 692 stores the pointer within reserved processor register 696, which can be read by application-level code 698. Reserved processor register 696 points to the starting memory location for thread-specific data structure 699 that is used to manage the application thread that is executing on the processor. The processor number of the processor that is executing the application thread is stored at a known offset within thread-specific data structure 699, i.e., memory location 694 in the data structure that has been reserved for storing the processor number of the processor on which application-level code 698 is executing. Application-level code 698 uses the pointer from reserved processor register 696 to thread-specific data structure 699 plus the known offset within the thread-specific data structure to retrieve the processor number of its current processor from memory location 694. Thus, FIG. 6J is similar to FIG. 6H except that the processor number is stored within a special thread-specific data structure, e.g., a thread control block. A similar data structure with a corresponding offset to a field for the processor number could also be incorporated into the mechanism that is shown in FIG. 6E.

Although the present invention has been described with reference to performance measurement and analysis, the present invention has many other uses since the present invention may be employed in any multiprocessor environment in which timestamps are associated with particular processors. For example, applications may log the time of particular events on particular processors for subsequent purposes, and applications may use the present invention to assist with debugging time sensitive operations.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing a temporal value within a multiprocessor data processing system, the method comprising:

obtaining a first processor number that is associated with a first processor within the multiprocessor data processing system, wherein the first processor executes one or more instructions for the obtaining the first processor number;

obtaining, subsequent to the obtaining the first processor number, a first processor clock value that is associated with the first processor that executes one or more instructions for the obtaining the first processor clock value;

obtaining, subsequent to the obtaining the first processor clock value, a second processor number that is associated with a second processor within the multiprocessor data processing system, wherein the second processor executes one or more instructions for the step of obtaining the second processor number; and, associating the first processor number with the first processor clock value after determining that the first processor number is equal to the second processor number.

2. The method of claim 1 further comprising:

employing the first processor number along with the first processor clock value in a processor clock normalization operation after determining that the first processor number is equal to the second processor number.

3. The method of claim 1 further comprising:

retrieving a processor clock compensation value that is associated with the first processor that is identified by the first processor number after determining that the first processor number is equal to the second processor number; and arithmetically combining the processor clock compensation value with the first processor clock value.

4. The method of claim 3 wherein the processor clock compensation value indicates a temporal difference between the first processor and another processor within the multiprocessor data processing system that is characterized as a primary processor.

5. The method of claim 1 wherein the obtaining the first processor number is performed by application-level software.

6. The method of claim 5 wherein the obtaining the first processor number further comprises:

reading the first processor number from a register within the first processor.

7. The method of claim 6 wherein the register is a special purpose register for storing a processor number associated with a processor in a multiprocessor data processing system.

8. The method of claim 6 wherein the register has been reserved for storing a processor number associated with a processor in a multiprocessor data processing system.

9. The method of claim 5 wherein the obtaining the first processor number further comprises:

reading a memory pointer from a register within the first processor, wherein the register has been reserved for storing a memory pointer to a memory location that stores a processor number associated with a processor in a multiprocessor data processing system;

using the memory pointer to read the first processor number from the memory location.

10. The method of claim 5 wherein the obtaining the first processor number further comprises:

reading a memory pointer from a register within the first processor, wherein the register has been reserved for storing a memory pointer to a memory location at which a data structure is stored that contains a processor number associated with a processor in a multiprocessor data processing system;

using the memory pointer to read the first processor number from the data structure.

11. The method of claim 1 further comprising:
computing processor clock compensation values for a set of processors in the multiprocessor system by application-level software.

12. The method of claim 11 further comprising:
calculating a processor clock compensation value for the first processor as a difference between a clock value associated with a processor clock on the first processor and a clock value associated with a processor clock on a primary processor, wherein the primary processor is a processor within the multiprocessor data processing system that is characterized as a primary processor.

13. The method of claim 12 further comprising:
requesting execution on the first processor; reading the clock value associated with the processor clock on the first processor, wherein the first processor executes one or more instructions for the step of reading the clock value associated with the processor clock on the first processor;
requesting execution on the primary processor; and
reading the clock value associated with the processor clock on the primary processor, wherein the primary processor executes one or more instructions for the reading the clock value associated with the processor clock on the primary processor.

14. The method of claim 12 wherein the clock value associated with a processor clock on the first processor and the clock value associated with a processor clock on the primary processor are average clock values that have been computed from multiple respective readings of a processor clock on the first processor and a processor clock on the primary processor.

15. A computer program product on a tangible computer readable medium for use in a multiprocessor data processing system for processing a temporal value, the computer program product comprising:
instructions for obtaining a first processor number that is associated with a first processor within the multiprocessor data processing system, wherein the first processor executes one or more instructions for obtaining the first processor number;
instructions for obtaining, subsequent to obtaining the first processor number, a first processor clock value that is associated with a processor that executes one or more instructions for obtaining the first processor clock value;
instructions for obtaining, subsequent to obtaining the first processor clock value, a second processor number that is associated with a second processor within the multiprocessor data processing system, wherein the second processor executes one or more instructions for obtaining the second processor number; and
instructions for associating the first processor number with the first processor clock value after determining that the first processor number is equal to the second processor number.

16. The computer program product of claim 15 further comprising:
instructions for employing the first processor number along with the first processor clock value in a processor clock normalization operation after determining that the first processor number is equal to the second processor number.

17. The computer program product of claim 15 further comprising:
instructions for retrieving a processor clock compensation value that is associated with a processor that is identified by the first processor number after determining that the first processor number is equal to the second processor number; and
instructions for arithmetically combining the processor clock compensation value with the first processor clock value.

18. The computer program product of claim 17 wherein the processor clock compensation value indicates a temporal difference between the processor and another processor within the multiprocessor data processing system that is characterized as a primary processor.

19. An apparatus for processing a temporal value in a multiprocessor data processing system, the apparatus comprising:
means for obtaining a first processor number that is associated with a first processor within the multiprocessor data processing system, wherein the first processor operates the means for obtaining the first processor number;
means for obtaining, subsequent to obtaining the first processor number, a first processor clock value that is associated with a processor that operates the means for obtaining the processor clock value;
means for obtaining, subsequent to obtaining the first processor clock value, a second processor number that is associated with a second processor within the multiprocessor data processing system, wherein the second processor operates the means for obtaining the second processor number; and
means for associating the first processor number with the first processor clock value after determining that the first processor number is equal to the second processor number.

* * * * *